April 21, 1959
F. W. BAKER
2,882,600
GRASS TRIMMING DEVICE
Filed May 26, 1958
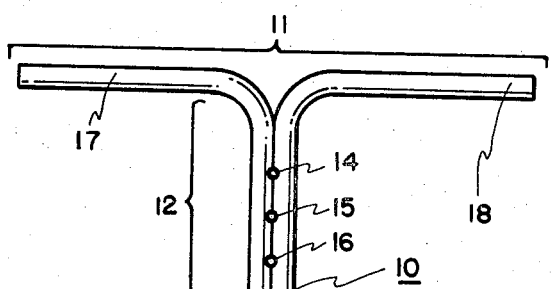
FIG. 1
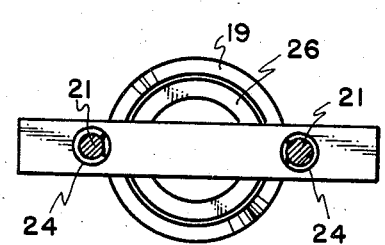
FIG. 2
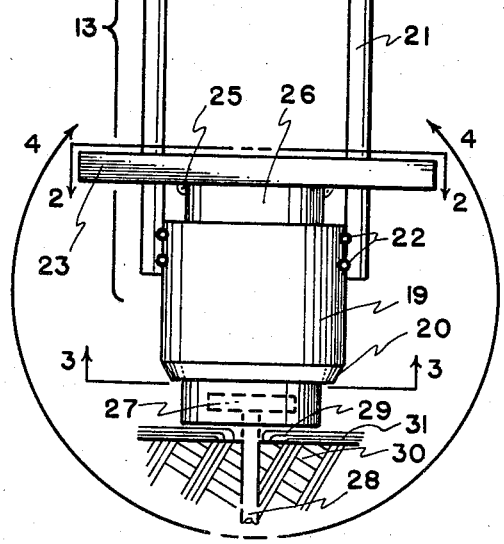
FIG. 3
FIG. 4
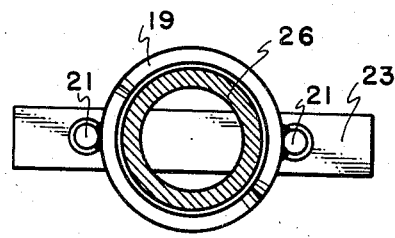
INVENTOR.
FRANK W. BAKER
BY M. Ralph Shaffer
HIS ATTORNEY

United States Patent Office 2,882,600
Patented Apr. 21, 1959

2,882,600

GRASS TRIMMING DEVICE

Frank W. Baker, Salt Lake City, Utah

Application May 26, 1958, Serial No. 737,701

2 Claims. (Cl. 30—316)

This invention relates to manually operated devices for trimming grass around lawn sprinkler heads, and more particularly to a new and improved trimming device which accomplishes its intended purpose very rapidly, efficiently and safely.

In the past many types of cutting devices have been devised for cutting grass and sod away from lawn sprinkler heads. Almost all of such devices of which the inventor is aware require for their operation a turning or twisting of the device so as to advance the cutting edge thereof around the sprinkler head. Most of such devices remove a good deal of sod during the sprinkler head cleaning operation, leaving a considerable depression about the sprinkler head. The torque necessarily required to complete the operation is often appreciable, thus tiring the operator. Further, the aforementioned depressions are dangerous, for children at play often trip over them when the toe of the shoe inadvertently slips into one of the depressions and underneath the sprinkler head.

If the operator does not wish to remove appreciable sod, then present devices appear to be unsatisfactory since, in manifesting a substantially horizontal cutting action, they will not cut grass alone for there is no reaction member to cooperate with the blade or cutting edge.

The present invention relies for its effectiveness upon vertical percussive blows of an outer cylindrical cutting member, with the earth itself being used as a reaction member; an inner cylindrical cutting member in surrounding the sprinkler head protects the same from inadvertent blows, serves as a guide for the outer cutting member, and also retains the grass, theretofore extending upwardly and outwardly from the sprinkler, against the earth or sod, to be chopped off by the outer cylinder.

Accordingly, an object of the present invention is to provide new and useful grass trimming device for trimming grass away from lawn sprinkler heads.

A further object of the present invention is to provide a new and improved device for trimming grass away from lawn sprinkler heads which will be highly efficient and may be operated very rapidly and safely.

According to the present invention, a preferred embodiment thereof includes a handle member having an upper handle portion, a central portion, and a pair of legs forming a lower U-shaped portion or clevis which is concave downward. An outer cylinder is affixed to and between the legs of the U-shaped portion and is provided with a lower peripheral cutting edge extending downwardly from the ends of the legs. A foot plate is provided with a pair of apertures accommodating the aforementioned legs and thus is adapted to slide up and down the lower U-shaped portion between the top thereof and the outer cylinder. Affixed to this foot plate is an inner cylinder which is adapted to travel within and through the outer cylinder so as to extend therebeyond at least in part. The bore of the inner cylinder is just slightly larger than the average sprinkler head.

When the lower peripheral edge of the inner cylinder is unsharpened, then it is merely inserted over the sprinkler head and is retained in place by means of foot pressure applied to the foot plate. The operator then actuates the handle member up and down so as to accomplish a series of percussion blows or impingements upon the grass and sod. Thus, the inner cylinder holds the grass down close to earth, so as to facilitate the cutting operation, and the outer cylinder chops it off. The inner cylinder in completely surrounding the sprinkler head protects the head from inadvertent blows by the outer cylinder.

When the lower peripheral edge of the inner cylinder is sharpened, then it too may possess a cutting action, once it is carefully positioned over the sprinkler head, by the operator pressing down on the foot plate by his foot. In this latter event, the device exhibits a double cutting action, thus increasing its effectiveness and also increasing the amount of grass cut away from around the sprinkler head.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1 is a front elevation of a representative embodiment of the present invention.

Figure 2 is a view partly in cross section taken along the line 2—2 in Figure 1.

Figure 3 is an upwardly directed view of the bottom of the device taken along the line 3—3 in Figure 1.

Figure 4 is a fragmentary elevation of the lower portion of the device taken along the line 4—4 in Figure 1, indicating that the inner cylinder of the device may also have a lower, peripheral sharpened edge.

In Figures 1 through 3 handle member 10 includes upper handle portion 11, central portion 12 and lower U-shaped portion 13, the latter being concave downward. Portions 11, 12 and 13 may in fact be formed by two rods configured as shown, spotwelded at points 14, 15 and 16, and having outwardly extending handle portions 17 and 18.

Outer cylinder 19 is provided with a lower peripheral cutting edge 20 and is affixed to the lower ends of legs 21, of lower U-shaped portion 13, by means of welds 22. As is seen in Figure 1, the cutting edge 20 protrudes beyond the ends of legs 21. A foot plate 23 is provided with a pair of apertures 24 which accommodate the slideable disposition therewithin of legs 21. Accordingly, the foot plate 23 is adapted to slide between the inverted base of the U and the top of the outer cylinder 19. Affixed by means of welds 25 to the lower surface of foot plate 23 is an inner cylinder 26; thus, the outer cylinder 19 is adapted to slide up and down relative to inner cylinder 26 by the operator alternately pulling up and pushing down the handle member 10 in a series of percussive movements.

Sprinkler head 27 and the water pipe 28 leading thereto are illustrated in dotted line configuration. Thus, the inner cylinder 26 as is shown is lowered over the sprinkler head 27 and, by virtue of its own weight, urges the grass blades 29, theretofore extending upwardly and outwardly from the sprinkler head, directly against the sod or earth 30. The operator then advances the handle member 10 downwardly in a series of percussive movements so as to enable the sharpened edge 20 of outer cylinder 19 to chop off the outer extremities 31 of the blades of grass. It is to be noted that the inner cylinder 26 serves three purposes: a guide for the outer cylinder 19, a protector of sprinkler head 27 and a retainer of the grass blades to be cut.

Figure 4 illustrates that the lower peripheral edge 400 of inner cylinder 26 may also be sharpened so as to provide a second cutter of the trimming device. In this event the operator need only exert slight foot pressure upon foot plate 23 in order to advance the inner cylinder 26 downwardly so as to cut the grass immediately about the periphery of sprinkler head 27. Such grass as is not cut by the inner cylinder will be retained thereby and will be chopped off by the up-and-down percussive motion of the outer cylinder.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A device for trimming grass around lawn sprinkler heads including, in combination, a handle member having an upper handle portion, a central portion, and a pair of legs forming a lower U-shaped portion concave downward; an outer cylinder affixed to said U-shaped portion between the legs thereof and having a lower peripheral cutting edge extending beyond said legs; a foot plate provided with a pair of apertures accommodating the slideable disposition therewithin of said legs of said U-shaped lower portion, said foot plate being slideably disposed therealong above said outer cylinder; and an inner cylinder affixed at its upper edge to said foot plate and adapted for progressive movement in and through said outer cylinder to extend at least in part therebeyond, the bore of said inner cylinder being slightly larger than the average sprinkler head and adapted to slip thereover.

2. Apparatus according to claim 1 in which said inner cylinder is also provided with a lower peripheral cutting edge.

References Cited in the file of this patent

UNITED STATES PATENTS

| | | |
|---|---|---|
| 1,857,383 | Johnson | May 10, 1932 |
| 2,516,448 | Canton | July 25, 1950 |